(12) United States Patent
Wade et al.

(10) Patent No.: US 8,732,427 B2
(45) Date of Patent: May 20, 2014

(54) SYSTEMS AND METHODS FOR COLLAPSING A DERIVATIVE VERSION OF A PRIMARY STORAGE VOLUME

(75) Inventors: Gregory L. Wade, San Jose, CA (US); J. Mitchell Haile, Somerville, MA (US)

(73) Assignee: Quantum Corporation, San Jose, CA (US)

( * ) Notice: Subject to any disclaimer, the term of this patent is extended or adjusted under 35 U.S.C. 154(b) by 556 days.

(21) Appl. No.: 12/848,863

(22) Filed: Nov. 17, 2010

(65) Prior Publication Data

US 2011/0060884 A1    Mar. 10, 2011

Related U.S. Application Data

(60) Provisional application No. 61/230,892, filed on Aug. 3, 2009.

(51) Int. Cl.
  *G06F 12/00* (2006.01)
  *G06F 3/06* (2006.01)
(52) U.S. Cl.
  USPC ............... 711/170; 711/154; 711/E12.005; 714/6.1; 714/E11.117; 718/1
(58) Field of Classification Search
  None
  See application file for complete search history.

(56) References Cited

U.S. PATENT DOCUMENTS

| 7,334,006 B1 * | 2/2008 | Cabrera | 707/202 |
| 7,447,854 B1 * | 11/2008 | Cannon | 711/162 |
| 7,743,028 B1 * | 6/2010 | Stringham et al. | 711/162 |
| 2003/0061456 A1 * | 3/2003 | Ofek et al. | 711/162 |
| 2003/0097611 A1 * | 5/2003 | Delaney et al. | 714/13 |
| 2005/0171979 A1 * | 8/2005 | Stager et al. | 707/200 |
| 2010/0011178 A1 | 1/2010 | Feathergill | |
| 2010/0077160 A1 * | 3/2010 | Liu et al. | 711/162 |
| 2010/0125598 A1 | 5/2010 | Lango et al. | |
| 2011/0055499 A1 * | 3/2011 | Sasson et al. | 711/162 |
| 2012/0072659 A1 * | 3/2012 | Wade et al. | 711/112 |

* cited by examiner

*Primary Examiner* — Matthew Bradley
*Assistant Examiner* — Daniel Bernard

(57) ABSTRACT

Disclosed is a method of collapsing a derivative version of a primary storage volume into the primary storage volume. The method comprises generating the derivative version of the primary storage volume that contains a plurality of data items stored in a secondary storage volume, wherein the derivation version comprises a plurality of blocks, identifying changed blocks of the plurality of blocks that changed as a result of modifying at least one of the data items, identifying which of the changed blocks of the plurality of blocks that changed remain allocated, and collapsing the derivative version of the primary storage volume into the primary storage volume by copying those blocks identified as changed and allocated to the primary storage volume.

15 Claims, 7 Drawing Sheets

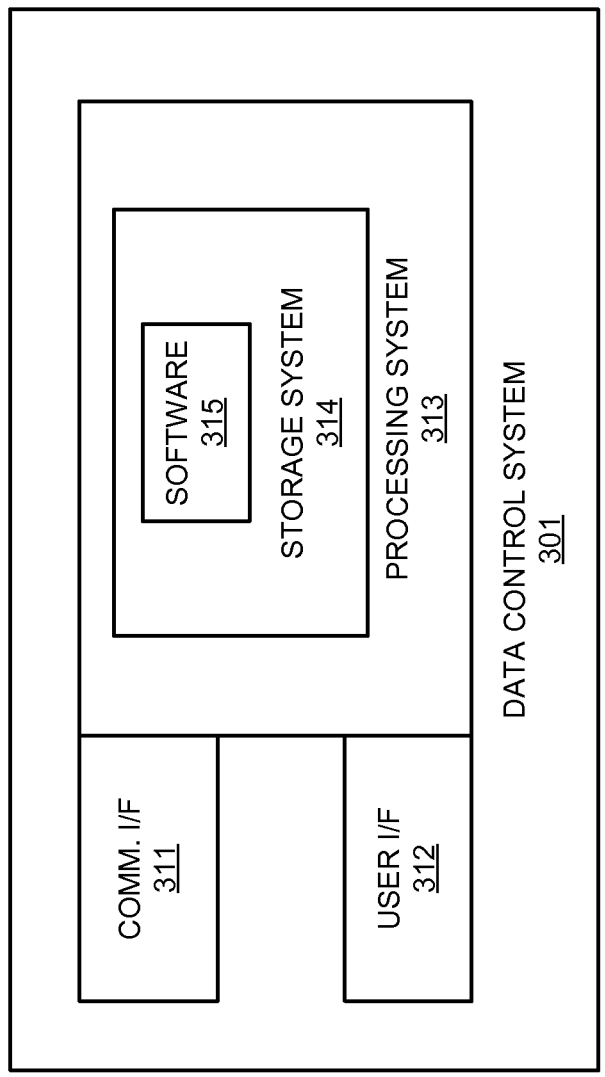

SYSTEMS AND METHODS FOR COLLAPSING A DERIVATIVE VERSION OF A PRIMARY STORAGE VOLUME

RELATED APPLICATIONS

This application is related to and claims priority to U.S. Provisional Patent Application No. 61/230,892, entitled "A Method for Optimizing Copy-On-Write Snapshot Collapsing using Filesystem Meta Data," filed on Aug. 3, 2009, and which is hereby incorporated by reference in its entirety.

TECHNICAL BACKGROUND

In the field of computer hardware and software technology, a virtual machine is a software implementation of a machine (computer) that executes program instructions like a real machine. Virtual machine technology allows for the sharing of, between multiple virtual machines, the physical resources underlying the virtual machines.

A technique known as copy-on-write allows multiple applications or processes to request access to the same resource. Once one of the processes attempts to modify the resource, a duplicate resource is created.

In virtual machine environments, storage volumes within the virtual machines contain data items that need to be accessed. Further complicating matters, a virtual machine environment utilizing copy-on-write may require access to the one or more duplicate storage volume.

Unfortunately, accessing the underlying contents of a storage volume and/or a duplicate storage volume can be very resource intensive, reducing the performance of a virtual machine and other operations within a virtual machine environment.

OVERVIEW

Disclosed are systems and methods for collapsing derivative versions of a primary storage volume into the primary storage volume. In an embodiment, the method comprises generating the derivative version of the primary storage volume that contains a plurality of data items stored in a secondary storage volume, wherein the derivation version comprises a plurality of blocks, identifying changed blocks of the plurality of blocks that changed as a result of modifying at least one of the data items, identifying which of the changed blocks of the plurality of blocks that changed remain allocated, and collapsing the derivative version of the primary storage volume into the primary storage volume by copying those blocks identified as changed and allocated to the primary storage volume.

In another embodiment, the derivative version of the primary storage volume comprises a snapshot of the primary storage volume.

In another embodiment, collapsing the derivative version of the primary storage volume into the primary storage volume comprises copying only those blocks identified as changed and allocated to the primary storage volume.

In another embodiment, the method further comprises identifying which of the blocks identified as changed and allocated are non-transient and wherein collapsing the derivative version of the primary storage volume into the primary storage volume further comprises copying those blocks identified as changed, allocated, and non-transient to the primary storage volume.

In another embodiment, copying those blocks identified as changed, allocated, and non-transient allocated to the primary storage volume comprises copying only those blocks identified as changed, allocated, and non-transient.

In another embodiment, modifying the at least one of the data items is done by a first process.

In another embodiment, identifying changed blocks of the plurality of blocks that changed is based on meta data.

In another embodiment, the method further comprises removing the derivative version of the primary storage volume after collapsing the derivative version of the primary storage volume into the primary storage volume.

In yet another embodiment, a data control system for collapsing a derivative version of a primary storage volume into the storage volume comprises an interface configured to receive a first request to generate the derivative version of the primary storage volume and to receive a second request to collapse the derivative version of the primary storage volume, and a processor in communication with the interface and configured to receive the first request and generate the derivative version of the primary storage volume that contains a plurality of data items stored in a secondary storage volume, wherein the derivation version comprises a plurality of blocks, and wherein the processor further configured to receive the second request, identify changed blocks of the plurality of blocks that changed as a result of modifying at least one of the data items, identify which of the changed blocks of the plurality of blocks that changed remain allocated, and collapse the derivative version of the primary storage volume into the primary storage volume by copying those blocks identified as changed and allocated to the primary storage volume.

In another embodiment, the derivative version of the primary storage volume comprises a snapshot of the primary storage volume.

In another embodiment, the processor is configured to copy only those blocks identified as changed and allocated to the primary storage volume.

In another embodiment, the processor is further configured to identify which of the blocks identified as changed and allocated are non-transient and to collapse the derivative version of the primary storage volume into the primary storage volume, the processor is further configured to copy those blocks identified as changed, allocated, and non-transient to the primary storage volume.

In another embodiment, the processor is configured to copy only those blocks identified as changed, allocated, and non-transient to the primary storage volume.

In another embodiment, modifying the at least one of the data items is done by a first process.

In another embodiment, identifying changed blocks of the plurality of blocks that changed is based on meta data.

In another embodiment, the processor is further configured to remove the derivative version of the primary storage volume after collapsing the derivative version of the primary storage volume into the primary storage volume.

In yet another embodiment, a computer readable medium is disclosed having program instructions stored thereon for operating a data control system, that when executed by a data control system, direct the data control system to generate the derivative version of the primary storage volume that contains a plurality of data items stored in a secondary storage volume, wherein the derivation version comprises a plurality of blocks, identify changed blocks of the plurality of blocks that changed as a result of modifying at least one of the data items, identify which of the changed blocks of the plurality of blocks that changed remain allocated, and collapse the derivative version of the primary storage volume into the primary storage volume by copying those blocks identified as changed and allocated to the primary storage volume.

BRIEF DESCRIPTION OF THE DRAWINGS

FIG. 3 illustrates a data control system according to an embodiment.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

In virtual machine environments, accessing the underlying contents of a storage volume can be very resource intensive, reducing the performance of a virtual machine and other operations within a virtual machine environment.

Some virtual machine environments use an optimization strategy known as copy-on-write. Copy-on-write allows multiple processes to request access to the same resource. Once one of the processes attempts to modify the resource, a derivative version of the resource is created. Over time the derivative version of the resource grows as the process modifies the underlying blocks. Further complicating matters, those skilled in the art will appreciate that derivative version of a resource may themselves have derivative versions creating a chain of derivatives. Eventually, the derivative version(s) of the resource must be collapsed or merged back into the resource by copying the modified or changed blocks back into the resource.

Advantageously, the number of blocks that need to be copied in order to collapse the derivative version of the resource back into the resource can be reduced by copying only those blocks that changed and remain allocated in the resource.

Figure 1:
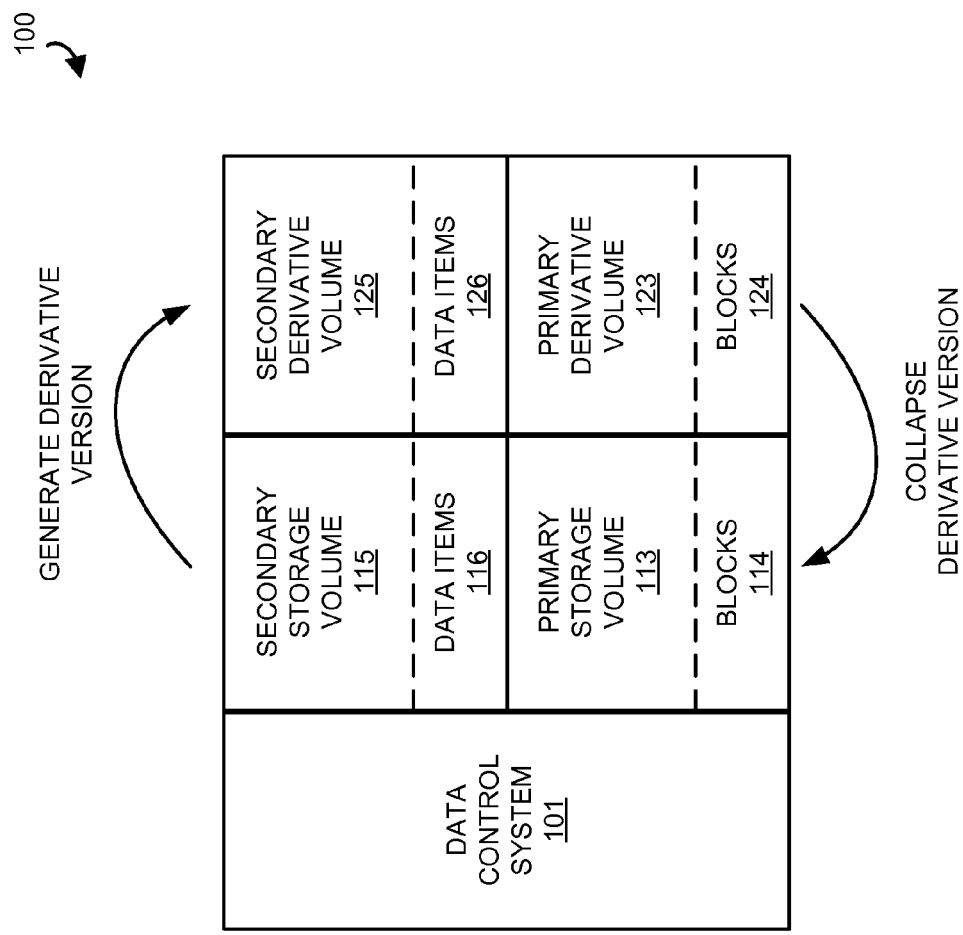
FIG. 1 illustrates a data control system according to an embodiment.

Referring now to FIG. 1, data control environment 100 is illustrated in an embodiment whereby data control system 101 is implemented in the data control environment 100 in order to generate a derivative version of a primary storage volume and then collapse the derivative version back into the primary storage volume.

As shown, data control environment 100 includes data control system 101, primary storage volume 113, and primary derivative volume 123. Primary storage volume 113 is comprised of blocks 114. Primary storage volume 113 includes secondary storage volume 115. Secondary storage volume 115 includes data items 116.

Primary derivative volume 123 is a derivative version of primary storage volume 113. Primary derivative volume 123 is comprised of blocks 124. Primary derivative volume 123 includes secondary storage volume 125. Secondary derivative volume 125 includes data items 126.

Primary storage volume 113, primary derivative volume 123, secondary storage volume 115, and secondary derivative volume 125 may be any storage volumes capable of storing a volume of data. As discussed, primary storage volume 113 is comprised of blocks 114 and primary derivative volume 123 is comprised of blocks 124. Each block comprises a section of the primary volume that corresponds to one or more data items in the secondary volume.

Data items 116 and 126 comprise the volume of data in secondary storage volume 115 and secondary derivative volume 125, respectively. Each data item 116 corresponds to one or more blocks 114 in secondary storage volume 115. Similarly, each data item 126 corresponds to one or more blocks 124 in secondary derivative volume 125.

Data control system 101 comprises any system or collection of systems capable of generating primary derivative volume 123 and then collapsing primary derivative volume 123 back into primary storage volume 113. Data control system 101 may be a micro-processor, an application specific integrated circuit, a general purpose computer, a server computer, or any combination or variation thereof.

Data control system 101 may control access (i.e., reads and writes) to the contents of a virtual drive (e.g., to data items 116 of secondary storage volume 115 and/or to blocks 114 of primary storage volume 113). Data control system 101 may allow multiple processes to read the contents of the virtual drive. However, in operation, when one of the processes attempts to write or modify the contents of the virtual drive, data control system 101 generates a derivative version of the virtual drive so that other processes reading the virtual drive are not interrupted.

In operation, data control system 101 generates primary derivative volume 123. Primary derivative volume 123 is a derivative version of primary storage volume 113 which may initially be an individual copy of primary storage volume 113 which is accessible to one or more processes. Those skilled in the art will appreciate that primary derivative volume 123 may not be an exact copy of primary storage volume 113.

Once generated, the process requesting the write has an individual version of primary storage volume 113 (i.e., primary derivative volume 123) which may be modified and/or otherwise changed. Typically, primary derivative volume 123 grows over time as the data items 126 and/or blocks 124 are changed by the process that requested the write. As blocks 124 of primary derivative volume 123 are changed, data control system 101, primary derivative volume 123, and/or primary storage volume 113 may track those changed blocks. In addition, data control system 101 tracks those blocks in the primary storage volume 113 (the ancestor disk) that remain allocated or free.

Data control system 101 may receive an instruction, request, or other indication that the process no longer needs access to primary derivative volume 123. At this point, data control system 101 collapses primary derivative volume 123 back into primary storage volume 113 by copying the modified or changed blocks from primary derivative volume 123 to primary storage volume 113.

Prior to copying all the changed blocks from primary derivative volume 123 to primary storage volume 113, data control system 101 first identifies which of the changed blocks are free blocks (or unallocated blocks). Identifying the changed blocks that remain allocated allows data control system 101 to copy only those changed blocks that also remain allocated. Consequently, data control system 101 does not have to read the contents of changed and unallocated blocks from primary derivative volume 123, which optimizes the I/O cost of collapsing primary derivative volume 123 back into the primary storage volume 113.

Figure 2:
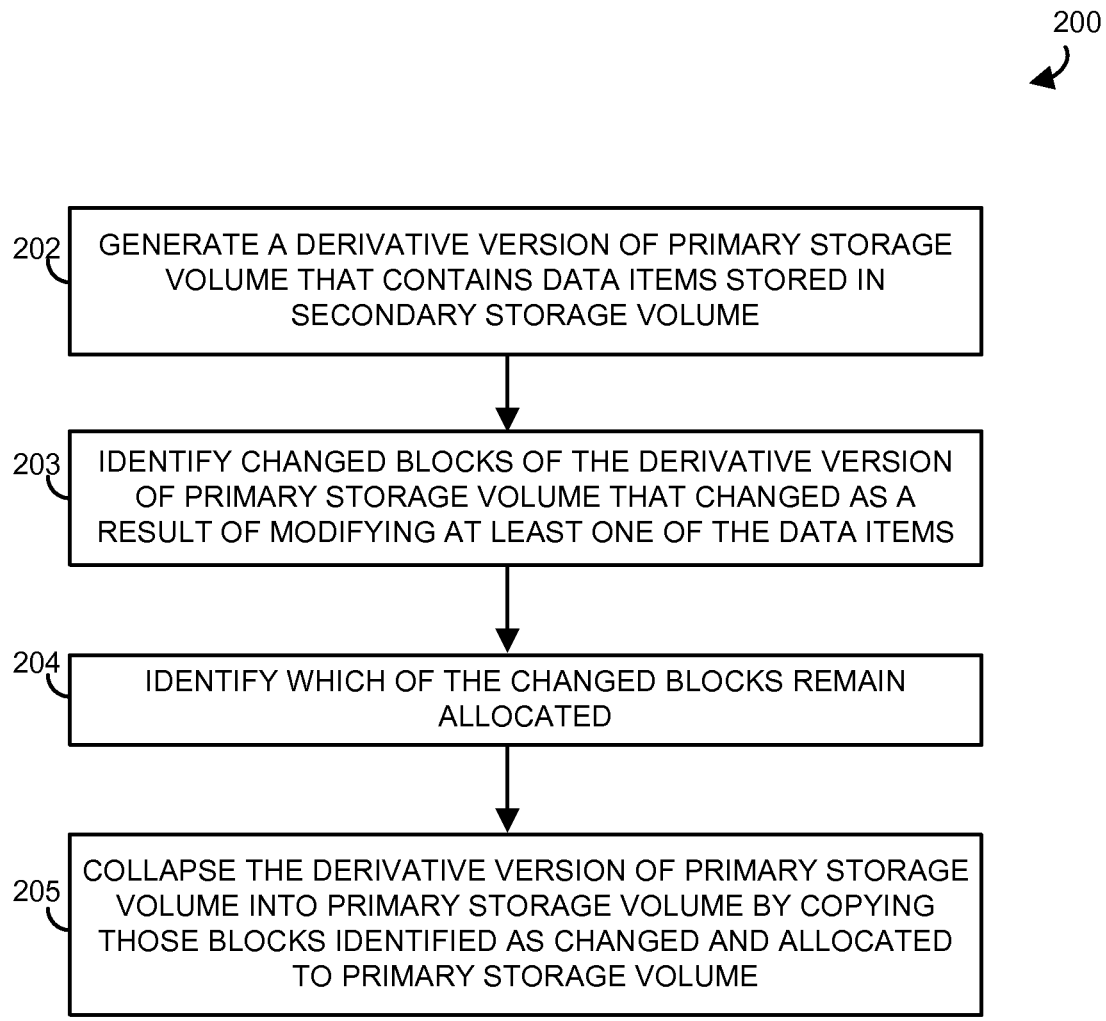
FIG. 2 illustrates the operation of a data control system according to an embodiment.

FIG. 2 illustrates process 200 describing the operation of data control system 101 in data control environment 100. To begin, a volume of data is generated and stored on a primary storage volume. Data control system 101 includes a processor that generates a derivative version of a primary storage volume comprised of blocks that contain data items stored in a secondary storage volume (Step 202). For example, the processor in data control system 101 may generate primary derivative volume 123 which includes data items 126 stored in secondary derivative volume 125. In this example primary derivative volume 123 is a derivative version of primary storage volume 113.

As discussed, primary storage volume 113 is comprised of blocks 114 and includes secondary storage volume 115 and secondary storage volume 115 comprises data items 116. In some examples, derivative version of blocks 114, secondary storage volume 115, and data items 116 are also created when the processor in data control system 101 generates a derivative version of primary storage volume 113.

Primary derivative volume 123 may be generated as a result or in response to a number of events. For example, data control system 101 may receive a request, instruction, or other indication from a process attempting to write to primary storage volume 113. The processor in data control system 101 may generate primary derivative volume 123 in response to the request, instruction, and/or other indication.

Once generated, the processor in data control system 101 identifies changed blocks of the derivative version of primary storage volume 113 (Step 204). The processor may determine the changed blocks using a changed block list which tracks the blocks that change. The changed block list may be maintained by data control system 101, primary derivative volume 123, and/or primary storage volume 113.

The processor in data control system 101 then identifies which changed blocks on the derivative version of the primary storage volume remain allocated (Step 206). The processor in data control system 101 may identify the allocated blocks by determining which blocks on primary storage volume 113 are free blocks (or unallocated blocks). In one example, the processor in data control system 101 may determine the allocation status of the blocks based on, for example, a volume meta data (bitmap). Once the free blocks are determined, the processor in data control system 101 can then copy those changed blocks 124 that remain allocated to primary storage volume 113.

Lastly, the processor in data control system 101 collapses the derivative version of the primary storage volume into the primary storage volume by copying those blocks identified as changed and allocated to the primary storage volume (Step 208). For example, the processor in data control system 101 copies blocks 124 that have changed and that are still allocated in primary storage volume 113 back to primary storage volume 113.

FIG. 3 illustrates data control system 301 according to an embodiment. Data control system 301 includes communication interface 311, user interface 312, processing system 315, storage system 116, and software 113.

Processing system 315 is linked to communication interface 311 and user interface 312. Processing system 315 includes processing circuitry and storage system 316 that stores software 313. Data control system 301 may include other well-known components such as a power system and enclosure that are not shown for clarity.

Communication interface 311 comprises a network card, network interface, port, or interface circuitry that allows data control system 301 to communicate with other elements of a data control environment. Communication interface 311 may also include a memory device, software, processing circuitry, or some other communication device. Communication interface 311 may use various protocols, such as host bus adapters (HBA), SCSI, SATA, Fibre Channel, iSCSI, WiFi, Ethernet, TCP/IP, or the like to communicate.

User interface 312 comprises components that interact with a user to receive user inputs and to present media and/or information. User interface 312 may include a speaker, microphone, buttons, lights, display screen, mouse, keyboard, or some other user input/output apparatus—including combinations thereof. User interface 312 may be omitted in some examples.

Processing system 315 may comprise a microprocessor and other circuitry that retrieves and executes software 313 from storage system 316. Storage system 316 comprises a disk drive, flash drive, data storage circuitry, or some other memory apparatus. Processing system 315 is typically mounted on a circuit board that may also hold storage system 316 and portions of communication interface 311 and user interface 312.

Software 313 comprises computer programs, firmware, or some other form of machine-readable processing instructions. Software 313 may include an operating system, utilities, drivers, network interfaces, applications, or some other type of software. When executed by processing system 315, software 313 directs processing system 315 to operate data control system 120 as described herein.

Figure 4A:
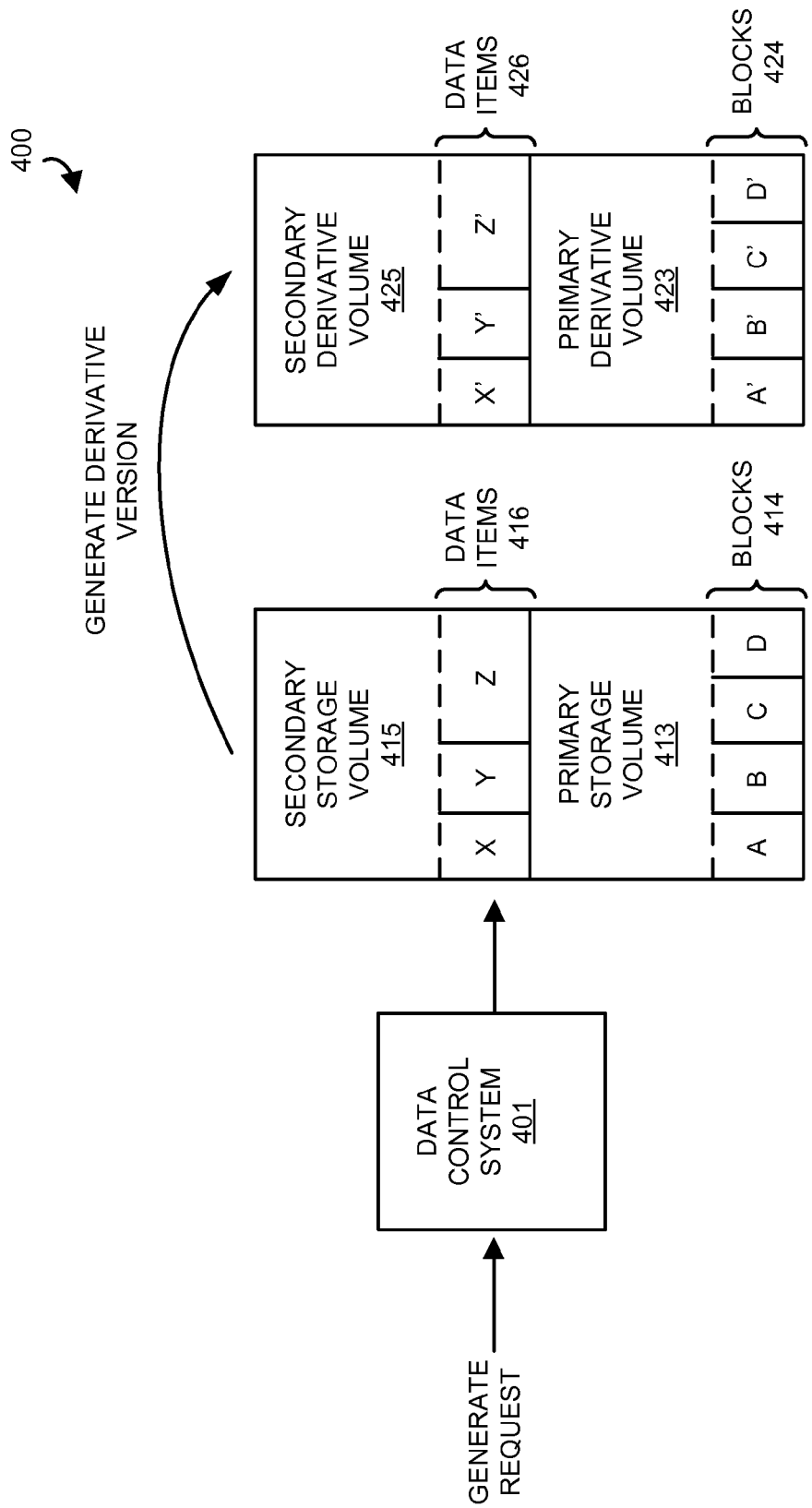
FIGS. 4A and 4B illustrate the operation of a data control system according to an embodiment.
Figure 4B:
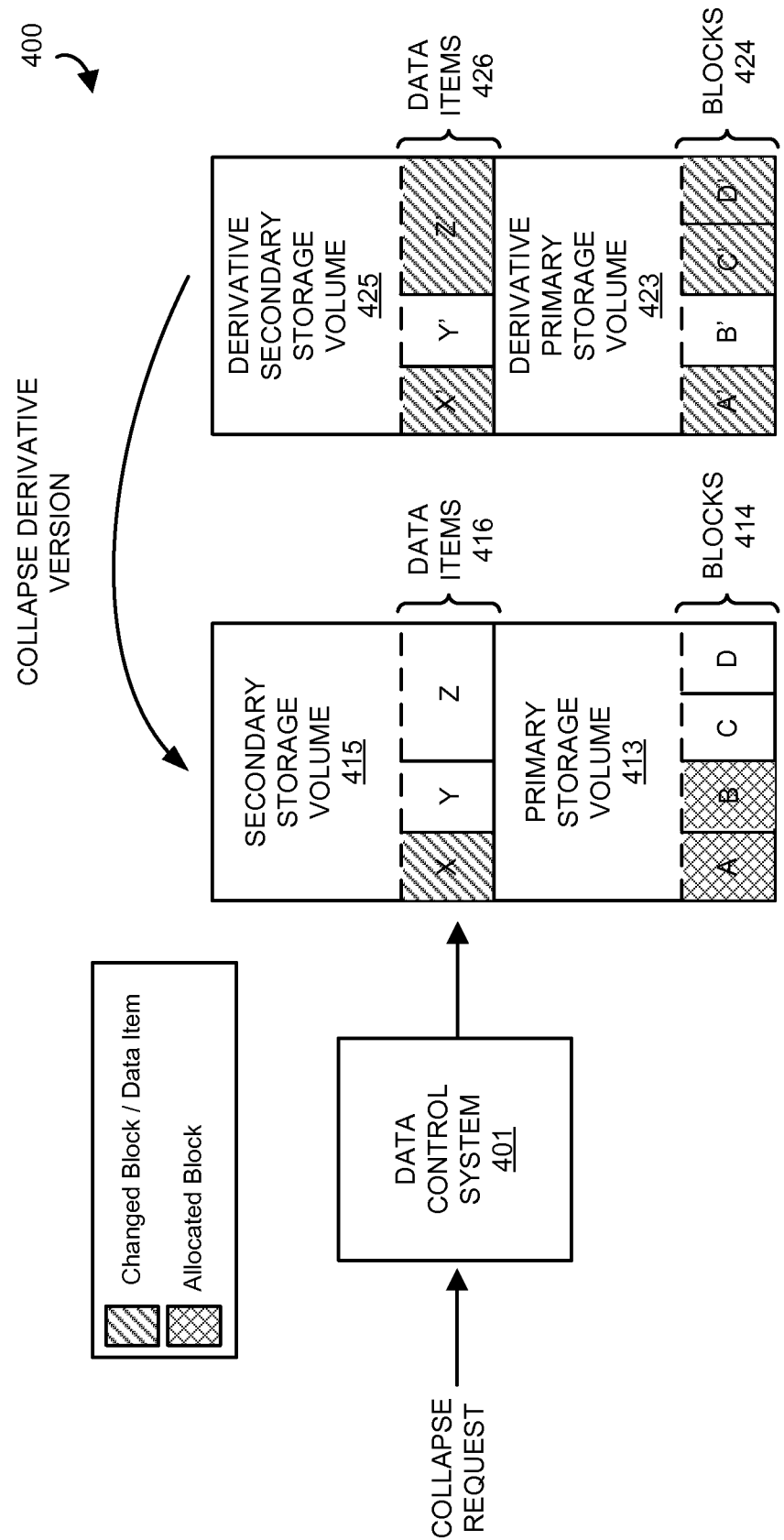

FIGS. 4A-4B illustrate a sequence of operations in data control environment 400 according to an embodiment. Referring first to FIG. 4A, which illustrates generation of a derivative version of a storage volume. As shown in this example, data control environment 400 includes data control system 401, primary storage volume 413, and primary derivative volume 423.

Primary storage volume 413 comprises blocks 414. Blocks 414 comprise block A, block B, block C, and block D. Primary storage volume 413 includes secondary storage volume 415 which comprises data items 416. Data items 416 include data item X, data item Y, and data item Z.

Primary derivative volume 423 comprises a derivative version of primary storage volume 413 which is generated by data control system 401 responsive to a Generate Request or other indication. Primary derivative volume 423 comprises blocks 424. Blocks 424 comprise block A, block B, block C, and block D. Primary derivative volume 423 includes secondary derivative volume 425 which comprises data items 426. Data items 426 include data item X', data item Y', and data item Z'.

As discussed, in operation data control system 401 receives a Generate Request and responsively generates a derivative version of primary storage volume 413 (i.e., primary derivative volume 423). Those skilled in the art will appreciate that a Generate Request may be generated within data control system 401 in response to some event or state. Moreover, those skilled in the art will also appreciate that the Generate Request may not be a request but some other indication. For example, in some embodiments the Generate Request may simply be generated by data control system 401 in response to receiving a write request from a process attempting to change one or more data items 416 on secondary storage volume 415.

Referring now to FIG. 4B, which illustrates changes in the derivative version of a storage volume being collapsed back into the storage volume. In this example, a derivative version of storage volume 413 has been generated and data items 426 are changed.

In operation, data control system 401 first identifies data item X' and data item Z' of secondary derivative volume 425 as changed in response to a Collapse Request. Those skilled in the art will appreciate that a Collapse Request may be generated within data control system 401 in response to some event or state. Moreover, those skilled in the art will also appreciate that the Collapse Request may not be a request but some other indication. For example, in some embodiments, a Collapse Request may simply be generated by data control system 401 in response to receiving a file release message from a process that previously issued a write request to change one or more of the data items 416 on secondary storage volume 415.

Data control system 401 then determines the changed blocks of blocks 424 that correspond to the identified changed data items X' and Z'. In this example, block A' corresponds to changed file X' and blocks C' and D' correspond to changed file Z'. Those skilled in the art will appreciate that multiple data items may correspond to a single block. Similarly, multiple blocks may correspond to a single data item.

Once the changed blocks have been identified, data control system 401 then identifies whether the identified changed blocks are still allocated or free. The allocation status of the identified changed blocks may be read from a volume meta data (bitmap) which may be located on the primary storage volume or the derivative version of the primary storage volume.

In this example, blocks A', C' and D' have been identified by data control system 401 as changed blocks. Data control system 401 determines the allocation status of blocks A', C', and D' in primary derivative volume 423 by examining the allocation status of blocks A, C, and D in primary storage volume 413. In this example, blocks A and B are allocated and blocks C and D are not allocated in primary storage volume 413.

The allocation status may be determined by accessing a volume meta data bitmap (not shown) of primary storage volume 413 and/or primary derivative volume 423. The volume meta data bitmap may be located on primary storage volume 413. In other embodiments, the volume meta data bitmap may be located elsewhere including within data control system 401. Those skilled in the art will appreciate that the allocation status of blocks A', C', and D' in primary derivative volume 423 may alternatively and/or additionally be determined by accessing a derivative volume meta data bitmap of primary derivative volume 423.

Data control system 401 then collapses the derivative version of the primary storage volume back into the primary storage volume by copying those blocks identified as changed and allocated to the primary storage volume. In this example, block A' is identified as changed and allocated in the derivative version of the primary storage volume. Consequently, data control system 401 does not have to read the contents of blocks C' and D' from primary derivative volume 423. Rather, only block A' need to be copied from primary derivative volume 423 to primary storage volume 413 which optimizes the I/O cost of collapsing primary derivative volume 423 back into primary storage volume 413. As a result, only data item A is updated in primary storage volume 413.

Figure 5:
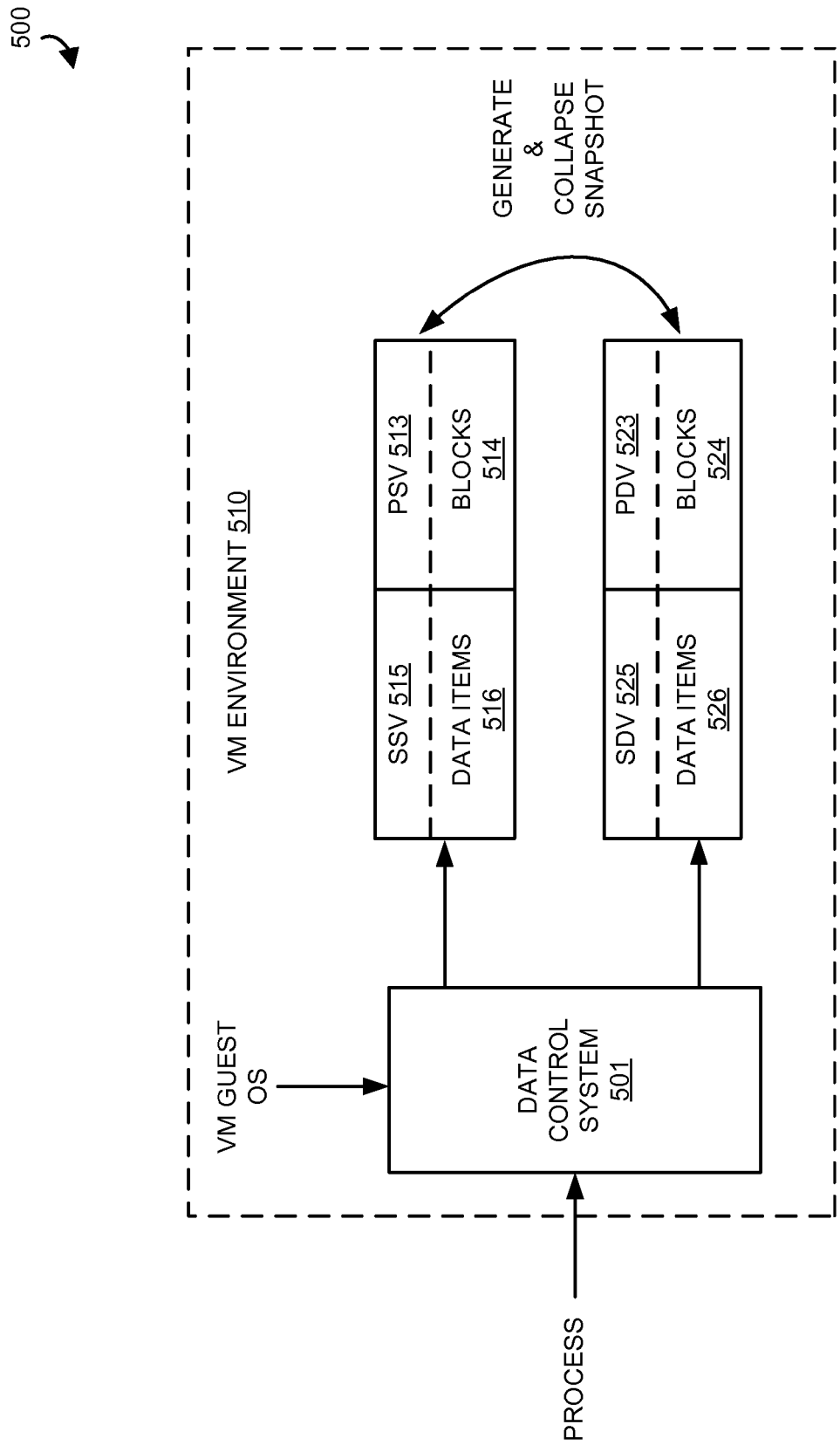
FIG. 5 illustrates a data control system environment according to an embodiment.

FIG. 5 illustrates a data control environment 500 according to an embodiment. In this example, data control system 501 is implemented in a virtual machine (VM) environment to generate and collapse a snapshot of a primary storage volume in response to input from one or more processes and/or one or more VM guest operating systems.

As shown in this example, VM environment 510 includes data control system 501, primary storage volume 513, and primary derivative volume 523. Elements of VM environment 510 may include, for example, virtual machines, hypervisors, server machines, and other underlying virtual files. Other elements are also possible although not shown for simplicity.

Primary storage volume 513 is comprised of blocks 514 and includes secondary storage volume 515. Secondary storage volume 515 includes data items 516. In this example, primary derivative volume 523 comprises a snapshot of primary storage volume 513 which includes data items 526. A snapshot is a read-only copy of a data set frozen at a point in time. The snapshot allows applications or processes to write (or modify) their data sets without interruption to other applications or processes which may be concurrently accessing the same data sets.

Data control system 501 comprises any system or collection of systems capable of generating a snapshot of primary storage volume 513 (i.e., primary derivative volume 523) and then collapsing the snapshot of primary storage volume 513 back into primary storage volume 513. Data control system 501 may be a micro-processor, an application specific integrated circuit, a general purpose computer, a server computer, or any combination or variation thereof. In this example, data control system 501 is shown within VM environment 510. Those skilled in the art will appreciate that in some embodiments data control system 501 may be located outside VM environment 510.

Primary storage volume 513 and secondary storage volume 515 may be any storage volumes capable of storing a volume of data. As discussed, primary storage volume 513 is comprised of blocks 514. Each block of blocks 514 comprises a section of primary storage volume 513 that corresponds to one or more data items 516 in secondary storage volume 515. Data items 516 comprise the volume of data in secondary storage volume 515 and each data item 516 corresponds to one or more blocks 514.

In this example, primary storage volume 513 comprises a v-disk file representing a virtual machine and secondary storage volume 515 comprises a virtual storage volume or drive. Secondary storage volume 515 includes data items which comprise the virtual storage contents of the virtual storage volume. The virtual storage contents of the virtual storage volume may be, for example, data files on the virtual storage volume.

In operation, data control system 501 controls access (i.e., reads and writes) to the contents of a virtual drive (e.g., to data items 516 of secondary storage volume 515 and/or to blocks 514 of primary storage volume 513). For example, data control system 501 may allow a process or a VM guest operating system (OS) to read the contents of the virtual drive. However, when the processes or the VM guest OS attempts to write or modify the contents of the virtual drive, data control system 501 responsively generates a snapshot of the virtual drive so that other processes reading the virtual drive are not disturbed.

In this example, data control system 501 generates primary derivative volume 523. Primary derivative volume 523 is a snapshot of primary storage volume 513 which is accessible to one or more processes and/or one or more or VM guest operating systems. Primary derivative volume 523 may initially be an individual copy of primary storage volume 513.

Those skilled in the art will appreciate that primary derivative volume 523 may not be an exact copy of primary storage volume 513.

Once primary derivative volume 523 is generated, the process or the VM guest OS requesting to write primary storage volume 113 has an individual version of primary storage volume 113 which may be modified and/or otherwise changed. Typically, this individual version (i.e., primary derivative volume 523) grows over time as the data items 526 and/or blocks 524 are changed by the process or the VM guest OS. Data control system 501, primary derivative volume 523, and/or primary storage volume 513 may track blocks 524 of the data volume in primary derivative volume 523 that have changed. In addition, data control system 501 tracks those blocks in the primary storage volume 513 (the ancestor disk) that remain allocated or free.

Data control system 501 may receive an instruction, request, or other indication from the process or the VM guest OS that primary derivative volume 523 is no longer needed. At this point data control system 501 collapses primary derivative volume 523 back into primary storage volume 513 by copying the modified or changed blocks from primary derivative volume 523 to primary storage volume 513.

Figure 6:
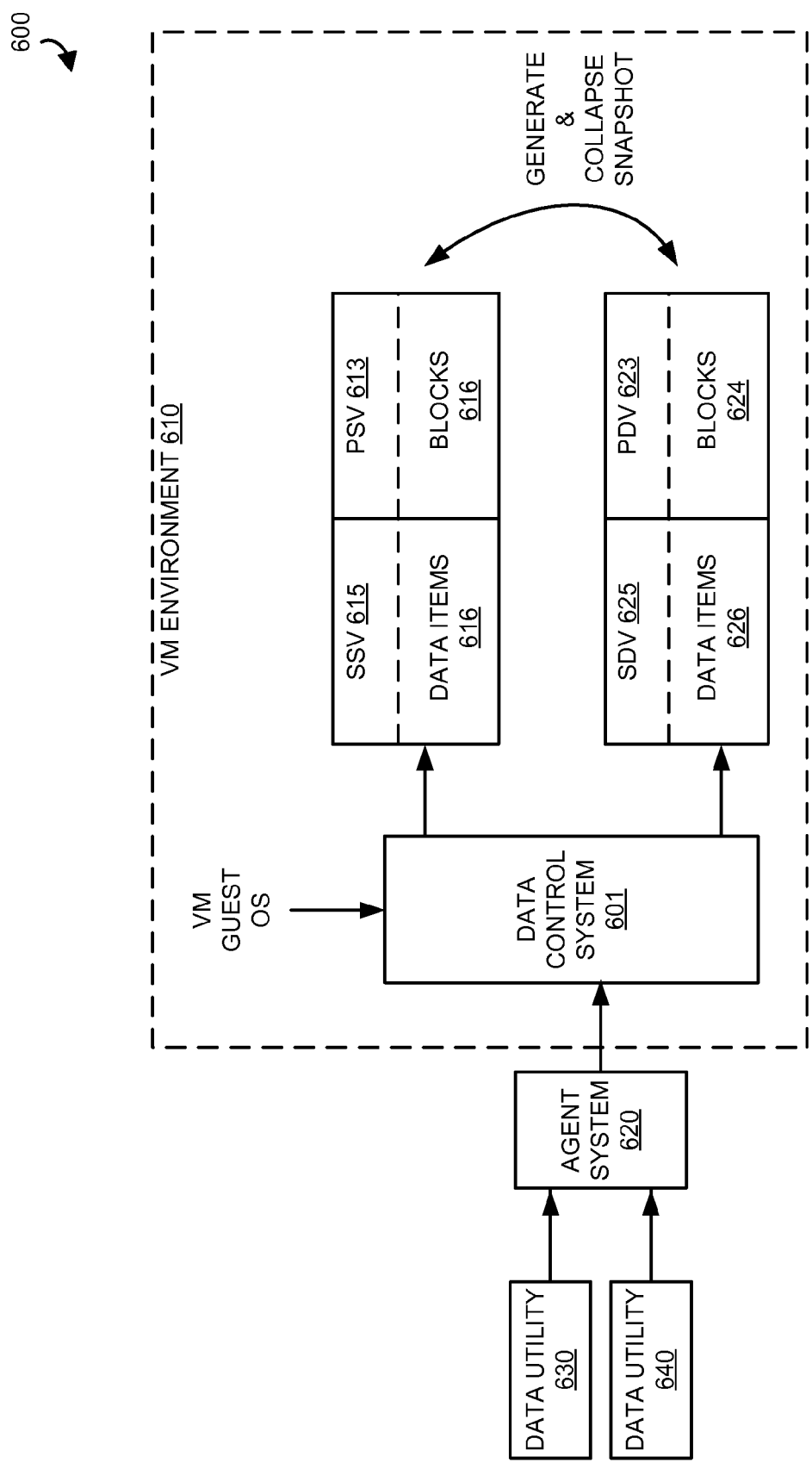
FIG. 6 illustrates a data control system environment according to an embodiment.

FIG. 6 illustrates a data control environment 600 according to an embodiment. In this example, data control system 601 is implemented in a virtual machine (VM) environment to generate and collapse a snapshot of a primary storage volume in response to from one or more data utilities and/or one or more VM guest operating systems (OS).

As shown in this example, data control environment 600 includes VM environment 610, agent system 620, and data utilities 630 and 640. VM environment 610 includes elements similar to elements of VM environment 510 of FIG. 5. In this example, data control system 501 is implemented in a virtual machine (VM) environment to generate and collapse a snapshot of a primary storage volume in response to input from one or more processes and/or one or more VM guest operating systems.

As shown in this example, VM environment 610 includes data control system 601, primary storage volume 613, and primary derivative volume 623. Elements of VM environment 610 may include, for example, virtual machines, hypervisors, server machines, and other underlying virtual files. Other elements are also possible although not shown for simplicity.

Primary storage volume 613 is comprised of blocks 614 and includes secondary storage volume 615. Secondary storage volume 615 includes data items 616. In this example, primary derivative volume 623 comprises a snapshot of primary storage volume 613 which includes data items 626. In this example, a snapshot is a read-only copy of a data set frozen at a point in time. The snapshot allows applications or processes to write (or modify) their data sets without interruption to other applications or processes which may be concurrently accessing the same data sets.

Data control system 601 comprises any system or collection of systems capable of generating primary derivative volume 623 (a snapshot of primary storage volume 613) and then collapsing primary derivative volume 623 back into primary storage volume 613. Data control system 601 may be a microprocessor, an application specific integrated circuit, a general purpose computer, a server computer, or any combination or variation thereof. In this example, data control system 601 is shown within VM environment 610. Those skilled in the art will appreciate that in some embodiments data control system 601 may be located outside VM environment 610.

Primary storage volume 613 and secondary storage volume 615 may be any storage volumes capable of storing a volume of data. As discussed, primary storage volume 613 is comprised of blocks 614. Each block of blocks 614 comprises a section of primary storage volume 613 that corresponds to one or more data items 616 in secondary storage volume 615. Data items 616 comprise the volume of data in secondary storage volume 615 and each data item 616 corresponds to one or more blocks 614.

In this example, primary storage volume 613 comprises a v-disk file representing a virtual machine and secondary storage volume 615 comprises a virtual storage volume or drive. Secondary storage volume 615 includes data items which comprise the virtual storage contents of the virtual storage volume. The virtual storage contents of the virtual storage volume may be, for example, data files on the virtual storage volume.

Agent system 620 may be any computer system, group of computer systems, custom hardware, or other device configured to communicate with VM environment 610 and data utilities 630 and 640. For example, agent system 620 may communicate with data utilities 630 and/or 640 to create generation and collapse requests for data control system 601.

A data utility (e.g., data utility 630 or data utility 640) may be, for example, a PC based backup system that needs to access the contents of primary storage volume 613 in order replicate the data items 616 or virus scanning software that needs to access the contents of primary storage volume 613 in order replicate the data items 616. Other examples are also possible.

In operation, data control system 601 controls access (i.e., reads and writes) to the contents of a virtual drive (e.g., to data items 616 of secondary storage volume 615 and/or to blocks 614 of primary storage volume 513). For example, data control system 601 may allow a data utility (through agent system 620) or a VM guest operating system (OS) access to read or write the contents of the virtual drive. When the data utility or the VM guest OS attempts to write or modify the contents of the virtual drive, data control system 601 responsively generates a snapshot of the virtual drive so that other processes reading the virtual drive are not disturbed.

Once primary derivative volume 623 is generated, the data utility or the VM guest OS requesting to write primary storage volume 613 has an individual version of primary storage volume 613 which may be modified and/or otherwise changed. Typically, this individual version (i.e., primary derivative volume 623) grows over time as the data items 626 and/or blocks 624 are changed by the process or the VM guest OS. Data control system 601, primary derivative volume 623, and/or primary storage volume 613 may track blocks 624 of the data volume in primary derivative volume 623 that have changed. In addition, data control system 601 tracks those blocks in the primary storage volume 613 (the ancestor disk) that remain allocated or free.

Data control system 601 may receive an instruction, request, or other indication from agent system 620 or the VM guest OS indicating that primary derivative volume 623 is no longer needed. At this point data control system 601 collapses primary derivative volume 623 back into primary storage volume 613 by copying the modified or changed blocks from primary derivative volume 623 to primary storage volume 613.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of collapsing a derivative version of a primary storage volume into the primary storage volume, the method comprising:
   generating the derivative version of the primary storage volume that contains a plurality of data items stored in a secondary storage volume, wherein the derivative version comprises a plurality of blocks;
   identifying changed blocks of the plurality of blocks that changed as a result of modifying at least one of the data items;
   identifying which of the changed blocks of the plurality of blocks that changed remain allocated;
   identifying which of the blocks identified as changed and allocated are non-transient; and
   collapsing the derivative version of the primary storage volume into the primary storage volume by copying those blocks identified as changed, allocated, and non-transient to the primary storage volume.

2. The method of claim 1 wherein the derivative version of the primary storage volume comprises a snapshot of the primary storage volume.

3. The method of claim 1 wherein collapsing the derivative version of the primary storage volume into the primary storage volume comprises copying only those blocks identified as changed and allocated to the primary storage volume.

4. The method of claim 1 wherein copying those blocks identified as changed, allocated, and non-transient allocated to the primary storage volume comprises copying only those blocks identified as changed, allocated, and non-transient.

5. The method of claim 1 wherein modifying the at least one of the data items is done by a first process.

6. The method of claim 1 wherein identifying changed blocks of the plurality of blocks that changed is based on meta data.

7. The method of claim 1 further comprising removing the derivative version of the primary storage volume after collapsing the derivative version of the primary storage volume into the primary storage volume.

8. A data control system for collapsing a derivative version of a primary storage volume into the storage volume, the system comprising:
   an interface configured to receive a first request to generate the derivative version of the primary storage volume and to receive a second request to collapse the derivative version of the primary storage volume; and
   a processor in communication with the interface and configured to receive the first request and generate the derivative version of the primary storage volume that contains a plurality of data items stored in a secondary storage volume, wherein the derivative version comprises a plurality of blocks; and
   the processor further configured to receive the second request, identify changed blocks of the plurality of blocks that changed as a result of modifying at least one of the data items, identify which of the changed blocks of the plurality of blocks that changed remain allocated, identify which of the blocks identified as changed and allocated are non-transient, and collapse the derivative version of the primary storage volume into the primary storage volume by copying those blocks identified as changed, allocated, and non-transient to the primary storage volume.

9. The data control system of claim 8 wherein the derivative version of the primary storage volume comprises a snapshot of the primary storage volume.

10. The data control system of claim 8 wherein the processor is configured to copy only those blocks identified as changed and allocated to the primary storage volume.

11. The data control system of claim 8 wherein the processor is configured to copy only those blocks identified as changed, allocated, and non-transient to the primary storage volume.

12. The data control system of claim 8 wherein modifying the at least one of the data items is done by a first process.

13. The data control system of claim 8 wherein identifying changed blocks of the plurality of blocks that changed is based on meta data.

14. The data control system of claim 8 wherein the processor is further configured to remove the derivative version of the primary storage volume after collapsing the derivative version of the primary storage volume into the primary storage volume.

15. A non-transitory computer readable medium having program instructions stored thereon for operating a data control system that, when executed by a data control system, direct the data control system to:
   generate a derivative version of a virtual machine file that contains a plurality of data items stored in a virtual disk, wherein the derivative version comprises a plurality of blocks;
   identify changed blocks of the plurality of blocks that changed as a result of modifying at least one of the data items;
   identify which of the changed blocks of the plurality of blocks that changed remain allocated;
   identifying which of the blocks identified as changed and allocated are non-transient; and
   collapse the derivative version of the virtual machine file into the virtual machine file by copying those blocks identified as changed, allocated, and non-transient to the virtual machine file.

* * * * *

UNITED STATES PATENT AND TRADEMARK OFFICE
CERTIFICATE OF CORRECTION

PATENT NO. : 8,732,427 B2  
APPLICATION NO. : 12/848863  
DATED : May 20, 2014  
INVENTOR(S) : Gregory L. Wade Page 1 of 1

It is certified that error appears in the above-identified patent and that said Letters Patent is hereby corrected as shown below:

On the Title Page
   The Application's Filing Date is incorrect. Please correct the Filing Date of Application No. 12/848,863 to read August 2, 2010.

Signed and Sealed this
Twenty-third Day of December, 2014

Michelle K. Lee
*Deputy Director of the United States Patent and Trademark Office*